United States Patent [19]

Krause

[11] 4,266,408
[45] May 12, 1981

[54] FILTER BLOCK AND METHOD OF MAKING THE SAME

[75] Inventor: Walter O. Krause, Newark, N.Y.

[73] Assignee: Parker-Hannifin Corporation, Cleveland, Ohio

[21] Appl. No.: 100,312

[22] Filed: Dec. 4, 1979

Related U.S. Application Data

[62] Division of Ser. No. 962,532, Nov. 20, 1978, Pat. No. 4,220,553, which is a division of Ser. No. 864,560, Dec. 27, 1977, Pat. No. 4,144,171.

[51] Int. Cl.³ .............................................. F25B 43/00
[52] U.S. Cl. ........................................... 62/474; 62/85
[58] Field of Search ........................... 62/85, 474, 475; 264/54; 252/428; 210/506, 496

[56] References Cited

U.S. PATENT DOCUMENTS

| | | | |
|---|---|---|---|
| 3,178,022 | 4/1966 | Balogh | 62/474 |
| 3,238,056 | 3/1966 | Pall et al. | 210/506 |
| 3,538,020 | 11/1970 | Heskett et al. | 210/496 |
| 3,545,227 | 12/1970 | Grahl | 62/475 |
| 3,572,050 | 3/1971 | Bottum | 62/474 |
| 3,811,347 | 5/1974 | Hayes | 252/428 |
| 3,853,026 | 11/1974 | Heskett et al. | 264/54 |
| 4,072,649 | 2/1978 | Kubens | 260/38 |
| 4,079,031 | 3/1978 | Sardessai et al. | 260/DIG. 40 |

*Primary Examiner*—Ronald C. Capossela
*Attorney, Agent, or Firm*—James A. Baker

[57] ABSTRACT

A filter-drier block for use in refrigeration systems to filter and remove moisture from the refrigerant fluid, and the method of making the block. The block is comprised of granular adsorbent material bound together to form a rigid block by the use of phenolic resin and polyisocyanate binders and characterized by a low pressure drop for fluid passing through the block. The method of making the block includes the steps of mixing dry adsorbent granules with solutions of the two binders, blow molding the mixture into a block, curing the resins with an alkaline gas, purging the block of the gas by passing air through the block, and heating the block to drive off the solvents for the binders. The invention also includes a refrigeration system utilizing the block.

2 Claims, 3 Drawing Figures

U.S. Patent  May 12, 1981  4,266,408
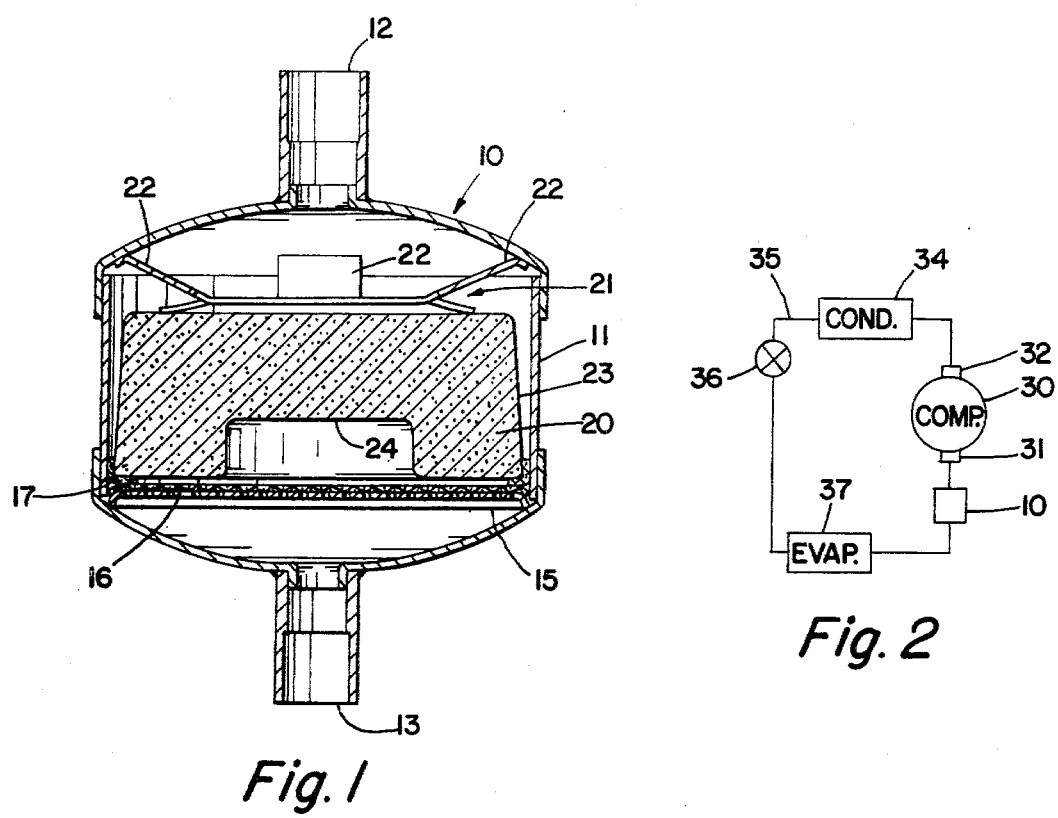
Fig. 1
Fig. 2
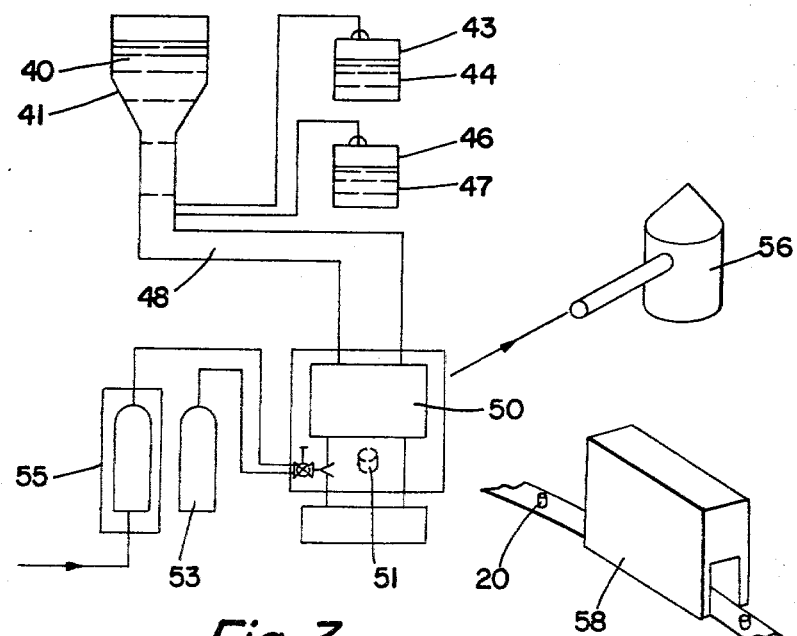
Fig. 3

FILTER BLOCK AND METHOD OF MAKING THE SAME

This is a division of application Ser. No. 962,532, filed Nov. 20, 1978, now U.S. Pat. No. 4,220,553 which in turn is a division of application Ser. No 864,560, filed Dec. 27, 1977, now U.S. Pat. No. 4,144,171.

BACKGROUND OF THE INVENTION

In refrigeration systems utilizing a holocarbon refrigerent fluid, as for example R-12, R-22, R-502, etc., pumped by a compressor through a condensor, an expansion valve and an evaporator and then returned to the intake side of the compressor, it is highly desirable to include a filter-drier unit for filtering particles of solid foreign matter from the fluid and for adsorbing water, acids, and other impurities from the fluid. Such foreign matter and impurities may be present at system startup or may be introduced at a later time because of motor burnout, leakage, in the suction line of the compressor, decomposition of organic substances in the compressor, etc. In the latter cases viscous tars are frequently formed that may plug capillary tubes, expansion valves and cause other damage unless removed.

Filter-drier units have heretofore been made in various forms, including solid but porous blocks through which the refrigerant fluid is required to pass. Such solid blocks have been made from granular adsorbent material such as zeolite molecular sieves, activated carbon, alumina, silica gel, or the like and wherein the granules have been adhered to each other by various binders. Heretofore such blocks when they contain sufficient binder have a comparatively high pressure drop because the binder material blocks pores between the granules.

Thus, for example, core blocks made in accordance with one current practice wherein adsorbents of 14 by 30 mesh grain size and constituting about 85% by weight of the block are bound together by a phenolic resin comprising the remaining 15% have a presure drop of about 11.7 inches of water through a section about ⅜" thick when air flows therethrough at about 400 cubic feet per hour. A pressure drop of this magnitude wastes energy during operation of the system.

Generally, most present commercially available filter driers use an inorganic binder material such as aluminum phosphate. These materials are relatively weak binders and therefore must be used in a relatively high proportion with respect to the adsorbents to yield a core block of sufficient tensile strength and resistance to spalling. Because of the high proportion of binder, the adsorbents must be of relatively large grain size to minimize clogging of the spaces between desiccant particles. The net result is a core block of relatively high pressure drop.

When organic binders are used the core blocks are generally formed by pressure molding wherein the binder-disiccant mixture is compacted in a mold between two punches. After compacting, the block is forced from the mold by one of the punches. This wipes the surface of the block and the binder flows into the clogs more of the pores near the surface than would otherwise occur. This also contributes to high pressure drop in the finished core block.

FIELD OF THE INVENTION

The present invention relates to a solid block type filter-drier for refrigeration systems, to the method of making the same, and to refrigeration systems utilizing the filter-drier.

SUMMARY OF THE INVENTION

It has been found that highly satisfactory core blocks for refrigeration system filter-drier units can be made by utilizing a two part binder of phenolic resin and a polyisocyanate (polyurethane) to bind the adsorbents and in which the binders are cured by passing an alkaline gas through the block. The adsorbents may be of relatively small particle size as compared with present practice. Also, the mixture of binders and adsorbents may be blown into a mold by air under pressure and the binders are then cured by passing a catalyst gas through the core block while it is still in the mold.

The finer particles provide a larger number of pores for fluid flow, and hence less overall pressure drop, and also provide more surface area exposed to contaminants. The blow molding technique, which is well known in the making of sand cores in foundry practice, provides more free volume between particles with less overall pressure drop then mechanical compacting. Furthermore, such free volumes are preserved during curing by the fact that curing is accomplished by passing a gaseous catalyst through the block. This method also avoids clogging of pores near the surface with displaced binder as occurs with mechanically compacted core blocks.

More particularly, the present invention provides a filter-drier for refrigeration system in which the filter-drier has a solid but porous core block that is composed of particulate adsorbent material such as activated carbon, alimina gel, silica gel, zeolite molecular sieves, or the like, of from about 14 by 30 to about 20 by 80 mesh bound together in a solid block of desired shape by a combination of phenolic and polyisocyanate (polyurethane) binders. The adsorbent comprises from about 86.5% to 97% by weight of the finished block and the remainder is a copolymer formed from the phenolic and polyurethane resins whereby the pressure drop of vaporized refrigerent fluid passing through the block is low as compared with previous filter-drier blocks for refrigeration use.

The invention also includes the process of making the core block wherein a mixture having from about 86.5%to 97% by weight adsorbent material and about equal parts of phenolic and polyisocyanate resins are formed into the desired shape of the block in a mold and cured while in the mold by an alkaline gas, the gas then being purged by an air stream through the block and the block is heated after removal from the mold to drive off remaining solvents.

DETAIL DESCRIPTION

FIG. 1 is a cross-section view of a filter-drier having a solid block of adsorbent material.

FIG. 2 is a schematic view of a refrigeration circuit showing a filter-drier on the suction side of a compressor.

FIG. 3 is a schematic view showing the method of making the filter-drier block.

As shown in FIG. 1, a typical filter-drier 10 for a refrigeration system may include a hollow housing 11 having an inlet port 12 and an outlet port 13. A perforated support member 15 is fitted in the housing near the outlet end and carries a screen 16 against which a gasket 17 rests. A porous filter-drier block 20 is held in place against gasket 17 in the housing by a spring member 21 having a plurality of spring fingers 22. The block has a tapered outer surface 23 spaced from the wall of the housing and it has a central recess 24 open toward the outlet end of the housing.

The filter-drier assembly of FIG. 1 may be used in a refrigeration system as shown in FIG. 2 wherein a compressor 30 pressurized vaporized refrigerant fluid entering its suction or low pressure inlet port 31 and discharges it through a high pressure outlet port 32 to a condensor 34, where the vapor is liquified, and then through conduit 35 to an expansion valve 36. From the expansion valve the fluid passes through an evaporator 37 and through filter-drier unit 10 where it is filtered to trap solid particles that may be entrained therein and where water, acids and other fluid impurities in the refrigerent fluid are absorbed by filter-drier block 20.

In previous refrigeration systems it has been the commom practice to place the filter-drier assembly 10 in the liquid line between the condensor and expansion valve on the outlet (high pressure) side of the compressor 30 because of the relatively high pressure drop of fluid passing through the filter-drier block. To avoid energy loss due to high pressure drop across the filter-drier block it is also a practice to install the filter-drier assembly on the suction side of the compressor for an initial or startup period for purging the refrigerant fluid of contaminants and then removing the filter-drier assembly for continued operation of the system without the pressure loss and consequent energy waste. However, such removal of the filter-drier assembly requires extra labor, down time of the system, and can result in inadvertent spillage of the refrigerent fluid, introduction of new contaminants or moisture, and gives no protection in the event of subsequent decomposition of organic materials in the compressor. Installation of the filter-drier on the suction side has advantages over installation on the high pressure side in that the fluid is cooler and the adsorbent is therefore more effective, contaminants are concentrated in the oil and are more readily removed by the block, and the refrigerent fluid does not compete with the adsorbent for the contaminants.

With a filter-drier assembly of relatively low pressure drop the assembly may be installed on the suction (inlet) side of the compressor and it may remain in the system during normal lifetime operation of the latter without causing significant energy waste and at the same time providing continuous protection to the compressor and other system components by removing solid particles, water and acids from the refrigerant fluid. Filter block 22 when made in accordance with the present invention comprises adsorbent particles of materials such as activated carbon, silica gel alumina gel, zeolite molecular sieves, etc. bound together so as to form a solid block by a mixture of two binder materials, namely a phenolic resin and a polyisocyanate. The adsorbent particles are of from 14 by 30 to 20 by 80 mesh to provide a large number of small spaces between particles and comprise from about 86.5% to about 97% by weight of the finished block. The binders fill only a very small portion of the interstitial space between the adsorbent particles to render the block very porous so the fluid may pass therethrough with a relatively low drop in pressure.

In the general procedure for making block 15, as illustrated in FIG. 3, dry adsorbent material 40 from a hopper 41 is mixed with a phenolic resin 43 from container 44 and a polyisocyanate 46 from container 47 in a continuous blender 48. The mixture is delivered to a core blower 50 that blows the mixture into individual molds 51 to form core block 20. An alkaline gas from a source 53 is then passed through the core blocks to set the binders. The gas supply is then shut off and air from a source 55 is passed through the core blocks to purge the same of the alkaline gas. This air with alkaline gas therein may be delivered to a scrubber unit 56 to salvage the alkaline gas by separating it from the air.

The core blocks are then removed from the molds and transferred to an oven 58 and heated to remove the solvents in the core block. The block is then permitted to cool and is stored in a hermetically sealed container until used. Heating the core blocks also improves the strength of the block and increases its resistance to spalling.

EXAMPLE 1

1000 grams of activated alumina gel sold by Aluminum Company of America under their designation H-51 and of 20 × 80 mesh grain were mixed with 75 grams of a phenol formaldehyde resole type resin supplied by Ashland Chemical Company under their designation EP65-20 and 75 grams of polyisocyanate (polyurethane) resin of the diphenol methane discoycate (DMI) type supplied by the same company under designation EP65-22. This mixture was blown into a core mold to form a core block shaped as shown at 15 in FIG. 1 with an OD of 3.75" at its upper or closed end and an OD of 3.50" at its loweror open end, a length of 1.44", and with a recess therein of 0.5" depth, 1.69" diameter at its bottom and 1.75" diameter at its entrance.

This core block was then cured by exposing it to dimethylethylamine gas at 15 psig for two seconds followed by a purge of air at 12 psig for five seconds. This completely cured the binder resins but the block was then removed from the mold and placed in an oven having a temperature of 450° F. for 30 minutes to drive off the solvents. When this was accomplished the block comprised about 91.4% by weight of adsorbent and about 8.6% binder. This core block, when installed in a housing as shown at 10 in FIG. 1 and subjected to air flowing through the block at 400 cu. ft. per hour exhibited a pressure drop of 1.5 inches of water. This pressure drop is considerably less than a pressure from of 3.3 inches of water obtained under the same conditions with like core blocks of like size and shape made with activated alumina of 14 by 28 mesh and a phenolic binder and wherein the absorbent comprises about 92% by weight of the block and the binder the remainder.

EXAMPLE 2

In another example, a core block was made and tested in the same manner as Example 1 but made from a mixture of 25% by weight of activated carbon Type 55 of 20 by 80 mesh and 75% by weight of activated alumina Type H-51 of 20×80 mesh. Ten parts by weight of this mixture was blended with one part each of the EP65-20 and EP65-22 binders before blowing into the core mold. The pressure drop was 3.0 inches of water. In this case the finished block comprised about 89% by weight of adsorbent and about 11% by weight of binder.

EXAMPLE 3

Another core block made and tested in the same manner as Example 1 but made from a mixture 15% zeolite molecular sieve of 14 by 30 mesh and 85% activated alumina H-51 of 20 by 80 mesh and wherein 1,000 grams of the mixture was blended with 75 grams each of the EP65-20 and EP65-22 solutions had a pressure drop of 1.4 inches of water. The finished block comprised about 91.4% by weight of adsorbent and about 8.6% binder.

EXAMPLE 4

A core block made from about 95.3% by weight of silica gel of 14 by 30 mesh furnished by W. R. Grace Company under their disignation PA400 and about 4.7% of equal parts of the EP65-20 and EP65-22 solutions had a pressure drop of 0.7 inches of water when otherwise made and tested in accordance with Example 1. The finished block comprised about 97% by weight adsorbent and about 3% binder.

EXAMPLE 5

Another core block made from 80% by weight of activated carbon of 20 by 50 mesh and 20% by weight of equal parts of the EP65-20 and EP65-22 binders and otherwise made and tested like the other examples herein described had a pressure drop of 4.1 inches of water The finished block comprised about 86.5% by weight adsorbent and 13.5 by weight binder.

In the above examples the weight of the adsorbent comprised from about 86.5% to about 97% of the weight of the finished blocks, the copolymer resin binder formed by reaction of the phenolic and polyurethane resins comprised from about 3% to 13.51% of the weight, the initial phenolic resin component comprised from about 1.2% to about 5.4% and the initial polyurethane resin component about 1.8 % to about 8.1%. The particle size of the adsorbent was either 14 by 30 or 20 by 80. The pressure drop through a given block at an air flow of 400 cubic feet per hour was from 0.7 inches of water to about 4.1 inches of water, which in each case was significantly lower than the pressure drop through a like size and shape of prior art block made with the use of a phenolic binder.

I claim:

1. In a refrigeration system that includes a closed circuit for the refrigerant fluid, a filter-drier unit having a porous block comprising particles of an adsorbed bound together by a copolymer formed from phenolic resin and a polyurethane resin, the ratio of the weight of the initial phenolic resin component to the weight of the finished block and the ratio of the weight of the initial polyurethane resin component to the weight of the finished block being selected so that the pressure drop of air at room temperature flowing through a one square inch section of ⅜ inch thickness of said finished block at 400 cubic feet per hour has a pressure drop of no greater than about 4 inches of water.

2. In a refrigeration system that includes a closed circuit for the refrigerant fluid, a filter-drier unit having a porous block comprising particles of an adsorbent bound together by a copolymer, said copolymer, being formed from a phenolic resin and a polyurethane resin, said particles comprising at least about 86.5 percent of said finished block by weight and no more than about 97 percent of said finished block by weight, said binder comprising at least about 3 percent of said finish block weight and no more than about 13.5 percent of said finished block by weight, the weight of the initial phenolic resin component being at least about 1.2 percent of said finished block by weight and no more than about 5.4 percent of said finished block by weight, and the weight of the initial polyurethane resin component being at least about 1.8 percent of said finished block by weight and no more than about 8.1 percent of said finished block by weight.

* * * * *

UNITED STATES PATENT AND TRADEMARK OFFICE
CERTIFICATE OF CORRECTION

PATENT NO. : 4,266,408

DATED : May 12, 1981

INVENTOR(S) : Walter O. Krause

It is certified that error appears in the above-identified patent and that said Letters Patent are hereby corrected as shown below:

In column 6, line 8, change "adsorbed" to---adsorbent

In column 6, line 27, add---by---after "finish block"

Signed and Sealed this

Fourteenth Day of July 1981

[SEAL]

Attest:

Attesting Officer

GERALD J. MOSSINGHOFF

Commissioner of Patents and Trademarks